US007810424B2

(12) United States Patent
Voss

(10) Patent No.: US 7,810,424 B2
(45) Date of Patent: Oct. 12, 2010

(54) DEVICE FOR INCREASING PRESSURE IN CYLINDERS WITH CONTROL UNIT

(76) Inventor: Wolfgang Voss, Beinrich-Lübke-Strasse 13A, Schwerte (DE) 58239

( * ) Notice: Subject to any disclaimer, the term of this patent is extended or adjusted under 35 U.S.C. 154(b) by 504 days.

(21) Appl. No.: 12/001,913

(22) Filed: Dec. 13, 2007

(65) Prior Publication Data

US 2008/0141669 A1 Jun. 19, 2008

(30) Foreign Application Priority Data

Dec. 14, 2006 (DE) ...................... 10 2006 059 040

(51) Int. Cl.
*E21D 23/26* (2006.01)
*B60T 13/58* (2006.01)

(52) U.S. Cl. .................................... 91/170 MP; 60/563

(58) Field of Classification Search ................... 60/563, 60/565; 91/6, 28, 170 MP
See application file for complete search history.

(56) References Cited

U.S. PATENT DOCUMENTS 4,465,408 A * 8/1984 Krieger et al. ......... 91/170 MP
4,798,417 A * 1/1989 Blumenthal et al. ..... 91/170 MP
7,424,803 B2 * 9/2008 Voss ............................ 60/563

FOREIGN PATENT DOCUMENTS

DE 10306128 8/2004

* cited by examiner

*Primary Examiner*—Michael Leslie
(74) *Attorney, Agent, or Firm*—James Creighton Wray; Meera P. Narasimhan

(57) ABSTRACT

In order to increase the pressure of the hydraulic medium in cylinders, especially those of the hydraulic longwall construction used in underground mining and tunnel construction, a control unit 21 is used which has suitably controllable, releasable check valves 29, 30 and 25, as well as a blockable check valve 31. These check valves and the associated directional valves create the possibility of filling both the cylinder space 20 proper and the piston rod cavity 26, which enables the pressure adjustment process with hydraulic medium in a specific manner, or accordingly their discharge, with no risk of reciprocal influence, seizing, or other damage.

12 Claims, 4 Drawing Sheets

DEVICE FOR INCREASING PRESSURE IN CYLINDERS WITH CONTROL UNIT

This application claims the benefit of German Application No. 10 2006 059 040.6 filed Dec. 14, 2006, which is hereby incorporated by reference in its entirety.

The invention concerns a device for increasing pressure in cylinders, especially those of hydraulic construction used in underground mining and tunnel construction, which, together with the cylinder housing, piston, piston rod, and the tensioning piston arranged therein, and the tensioning piston rod which can be inserted into the cylinder space, can be actuated with a hydraulic medium by means of a high-pressure pump, through the use of a connection line with an integrated control unit.

In the actuation of cylinders and similar devices, movement is achieved by feeding a pressure transmitter, which may consist of oil, water, water in oil, plasma or another liquid, or even air. Hydraulics should be understood as the theory and technical application of flows in compressible liquids. This means that, in hydraulics, the liquid B most frequently oil, but also a water-oil emulsion B is initially appropriately acted upon, i.e. prestressed, in a high-pressure pump, in order to be subsequently supplied to the cylinder by means of hoses or similar lines. The extension and retraction of the cylinders are controlled by means of valves, whereby the work is always conducted at one and the same pressure B that is, the pressure which depends on the performance of the high-pressure pump. Especially in underground mining and tunnel construction, where it is necessary to work with water-oil emulsions for safety reasons, the maximum operating pressure currently used is 400 bar, simply because, at this time, there are no pumps which can safely produce a higher level of pressure. Due to various circumstances, however, it is not always possible to ensure that the aforesaid pressure is available in the cylinder space. Accordingly, especially in underground mining and tunnel construction, so-called adjustment circuits are known with which the volume in the cylinder space can be adjusted through reconnection to the high-pressure pump in such a way that the pressure level in question is approximately available. However, it is not possible to create a higher level of pressure within the cylinder space, and accordingly within the cylinder, because the said pumps are not capable of doing this. For a wide variety of reasons, however, this is frequently desired, whereby the pumps set the limits for the aforesaid current maximum pressure level of 400 bar; and at lower levels of pressure, the expense required for an additional high-pressure pump and corresponding hoses would basically offset the advantage achieved. DE 103 06 128 A1 discloses a process and a corresponding cylinder, whereby a tensioning piston with a small piston rod is disposed within the cylinder housing proper, by means of which the cylinder space in the area of the piston and/or the water-oil emulsion present there can be compressed to a greater degree. This makes it possible, depending on the piston and tensioning piston selected and the path of displacement, to raise the pressure within the cylinder far above 400 bar. To be sure, a control unit which safely controls this pressure increasing device is not known at this time.

It is therefore the object of the invention to create a simple and safely operating control unit for cylinders, with an internal tensioning piston which significantly increases the pressure in the cylinder space.

The object is accomplished according to the invention by designing a control unit which has a releasable check valve in the connection line between the high-pressure pump and the piston rod cavity, and a valve block with releasable and/or blockable additional check valves in the connection line between the high-pressure pump and the cylinder space.

By means of the valve block with the releasable and/or blockable additional check valves, it is first of all possible to apply the necessary initial pressure for the extension of the piston inside the cylinder housing into the cylinder space, by establishing the connection with the high-pressure pump. To be sure, at the same time this valve block is constructed in such a way that, when the cylinder is subsequently discharged and/or when the high-pressure hydraulic medium is drained off, provision is also made for the hydraulic medium to be fed back into the tank by means of the same connection line, with no risk that this will give rise to an overload and thus to the breakdown of the entire control unit. In addition, the control unit features a releasable check valve in the area between the high-pressure pump and the piston rod cavity, so that, after the cylinder space has been filled and the piston rod has been extended, it is possible, by means of the tensioning piston and the tensioning piston rod, to raise the pressure in the cylinder space in a specific way such that, for example, with an initial pressure of 175 bar, the actuation of the tensioning piston subsequently creates a pressure of 700 bar within the cylinder space. It is accordingly possible, with one and the same cylinder design, to achieve a hydraulic construction which can be used in an extremely wide range of applications and with high setting pressures. By means of this design, it is possible, at 700 bar, to achieve a setting pressure of 600 t, which represents a significant improvement of safety underground.

According to an advantageous embodiment of the invention, the valve block features a check valve which blocks against the high-pressure pump and a releasable check valve which blocks against the cylinder space, as well as a blockable check valve which is associated with the tank. This makes it possible, by means of one and the same valve block, to initially feed the pressure via the first releasable check valve in the area of the high-pressure pump connection to the blockable check valve, so that the latter check valve closes and the hydraulic medium cannot get into the tank, but rather opens the second releasable check valve, so that the hydraulic medium can flow directly from the high-pressure pump into the cylinder space. When the cylinder space is filled and the subsequent "pressure adjustment" process can be initiated, the first check valve on the valve block closes and the connection between the high-pressure pump and the cylinder space is closed. This means that the hydraulic medium can now be fed via the releasable check valve located in the connection line to the piston rod cavity into the piston rod cavity, so that the tensioning piston is actuated. In this way, the "pressure adjustment" process, already mentioned more than once, is accomplished.

It has already been mentioned that a blockable check valve is also disposed in the valve block, and is designed such that it is a check valve which is blockable by means of connection to the high-pressure pump, but is otherwise permanently open. The closure piston, in this case, is not held in the closed position by means of a spring, but rather is acted upon in the opposite direction, so that the valve is always open. If this blockable check valve is now connected to the high-pressure pump, the valve piston will be pushed into the closed position, against the force of the spring, and this blockable check valve will close. In this way, as set forth above, the hydraulic medium can be safely conveyed by the high-pressure pump to the cylinder space, via the two releasable check valves. If the hydraulic medium is then drained off at the time of discharge, this is accomplished via the first check valve and the then unloaded blockable check valve, so that the hydraulic medium can flow directly into the tank. The second releasable check valve in the area of the high-pressure pump is closed, so that the hydraulic medium can flow only via the blockable check valve.

In order to ensure that faulty connections are prevented, the releasable check valve which blocks against the high-pressure pump can also be connected to the high-pressure pump on the opening side, at the same time as the blockable check valve. If the connection is accordingly opened, the hydraulic medium simultaneously flows into the blockable check valve, closes it, and opens the releasable check valve, so that the hydraulic medium can now flow via the first releasable check valve in the direction of the cylinder space. This ensures practically foolproof control.

The aforementioned blockable check valve and the check valve which blocks against the cylinder space are designed in such a way that each of them can be controlled by a 2/2-directional valve. As set forth above, upon activation of the 2/2-directional valve associated with the blockable check valve, the releasable check valve associated with the high-pressure pump is also simultaneously acted upon and opened, so that, thanks to the connection of these two check valves, only one 2/2-directional valve is needed here. The second 2/2-directional valve serves to open the first check valve, which is associated with the cylinder space, when the cylinder space is to be connected to the high-pressure pump.

In order to prevent an overload of the check valves in the valve block, a pressure switch, which can be adjusted to the filling pressure of the cylinder space, is provided at the outlet side of the check valve which blocks against the cylinder space. Both during the connection with the cylinder space and during the discharge of the cylinder space, this pressure switch ensures that a pressure of 175 bar, for example, prevails in the connection line. If this is not the case, the pressure switch closes. As set forth above, the pressure switch can be adjusted to the exact pressure level which is necessary and/or desired for each application.

The use of a pressure limit valve in cylinders of this type in underground mining and tunnel construction has been described in general terms previously. On the basis of the special circumstances in the case at hand, that is, the more or less optionally adjustable pressure conditions in the cylinder space, it is necessary to use a suitable pressure limit valve, for which purpose the invention provides for a pressure limit valve which is adjusted or adjustable to the pressure which is necessary or desired in the cylinder space, to be associated with the cylinder space. The pressure limit valve can or should be adjustable within suitably narrow limits, in order to very comprehensively ensure the necessary safety.

At the time of retraction of the cylinder and/or the associated piston, it is advantageous for a 2/2-directional control valve to be associated with the annular space around the piston rod, for connection to the high-pressure pump. This makes it possible, at the time of retraction of the piston, to apply pressure with the piston rod to the annular side of the piston, so that the retraction is supported and, even more importantly, accelerated and assured.

An additional control valve is necessary for the releasable check valve associated with the piston rod cavity. To this end, the invention provides for the releasable check valve associated with the piston rod cavity to be implemented in such a way that it can be controlled by a 3/4-directional valve. This makes it simple for the hydraulic medium required in order to increase the pressure in the cylinder space to be fed into the piston rod cavity, specifically by opening this releasable check valve and simultaneously feeding hydraulic medium through it. When the "compression adjustment" process is completed, this releasable check valve automatically closes and the support or setting work can be performed. At the time of discharge, this releasable check valve is again connected to the high-pressure pump by means of an additional switching operation, so that the hydraulic medium in the piston rod cavity features the same level and the releasable check valve opens and enables the hydraulic medium to exit in the direction of the tank.

The aforesaid three 2/2-directional valves and one 3/4-directional valve can be individually available and equipped. Accordingly, it is helpful to construct the 2/2-directional and 3/4-directional valves as electrically, hydraulically or electrically/hydraulically controllable control valves. In this regard, it is also conceivable for the 2/2-directional and 3/4-directional valves to be controlled by means of a common circuit board, so that the dependent switching and the time intervals necessary therefor may be easily preprogrammed and the entire process can run in an "automated" manner.

Precisely in the context of underground mining, it is advantageous for the required individual components to be stable in construction or to be protected by stable housings. The invention provides for this by ensuring that the valve block with the two releasable check valves and the blockable check valve features a common valve housing associated with the cylinder.

The invention is especially distinguished by the fact that a device is provided, by means of which a safe increase of the pressure of the hydraulic media in cylinders and similar components is made possible, with no risk of causing errors through any mistakes in the switching processes, dependent switching or the like. Rather, it has been found that the control unit according to the invention makes it possible to achieve a variable but specific increase of pressure in the cylinders in question. In this regard, the control valves and/or check valves required for this purpose are so skillfully and safely accommodated in a common housing that the special requirements of underground mining and tunnel construction can be advantageously satisfied.

BRIEF DESCRIPTION OF THE DRAWINGS

Additional details and advantages of the object of the invention may be observed in the following description of the related drawing, which shows a preferred embodiment with the necessary details and individual components. The drawings show.

DETAILED DESCRIPTION OF THE PREFERRED EMBODIMENTS

Figure 1:
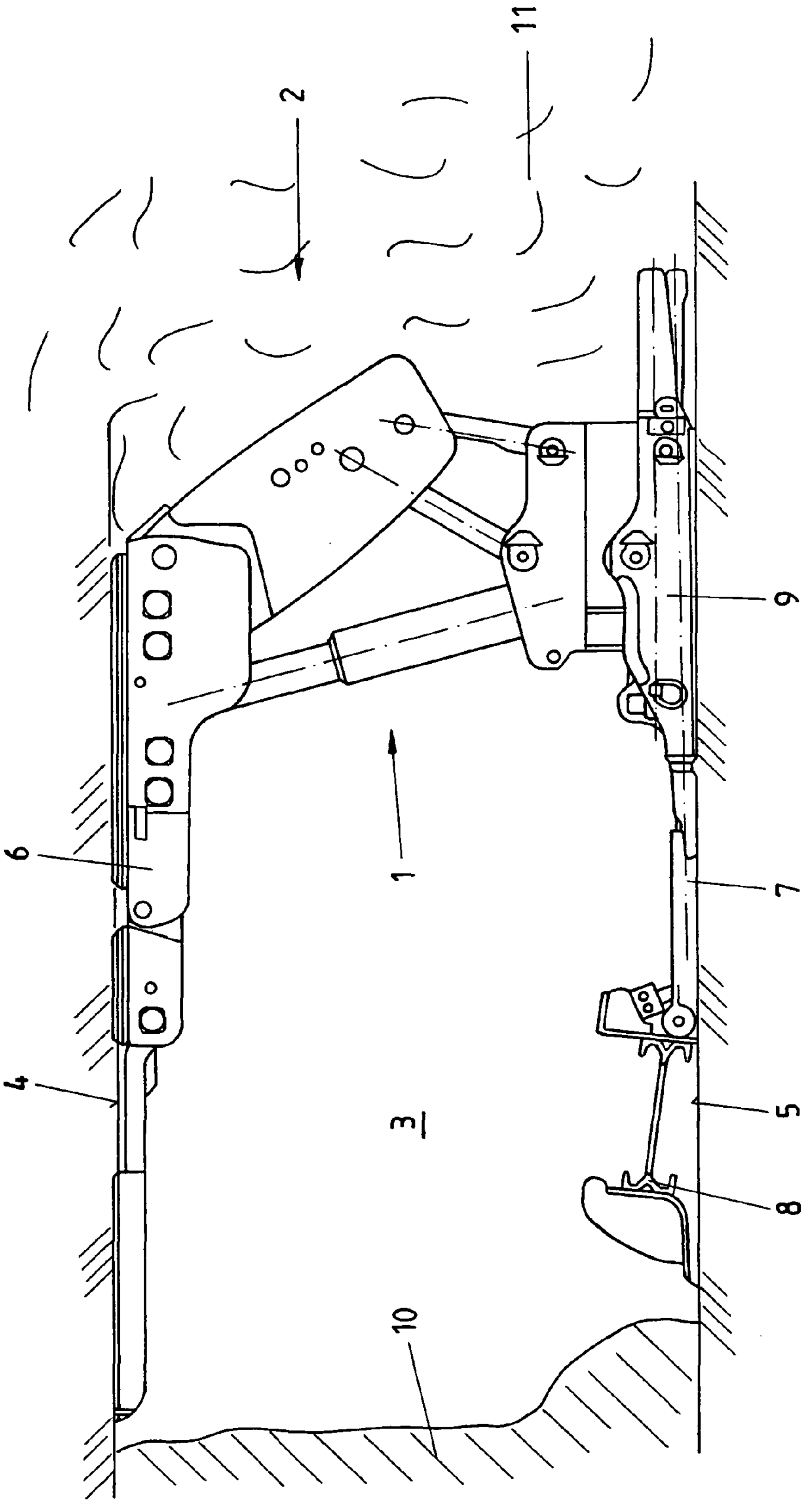
FIG. 1: a cylinder used in underground mining, in a hydraulic construction

FIG. 1 shows a cylinder 1, used in underground mining. It is part of the hydraulic construction 2 used in the face 3, so as to brace the hanging wall 4 and the footwall 5 against each other and thus to keep the created cavity open. The hanging wall cap 6 consists of the same number of parts as the floor beam 7, whereby the floor beam 7 accommodates the push cylinder 9, by means of which the face conveyor 8 can be displaced in the direction of the coal face 10. The goaf 11 falls behind the hydraulic construction 2, which is also designated as a shield construction, and re-closes the cavity.

Figure 2:
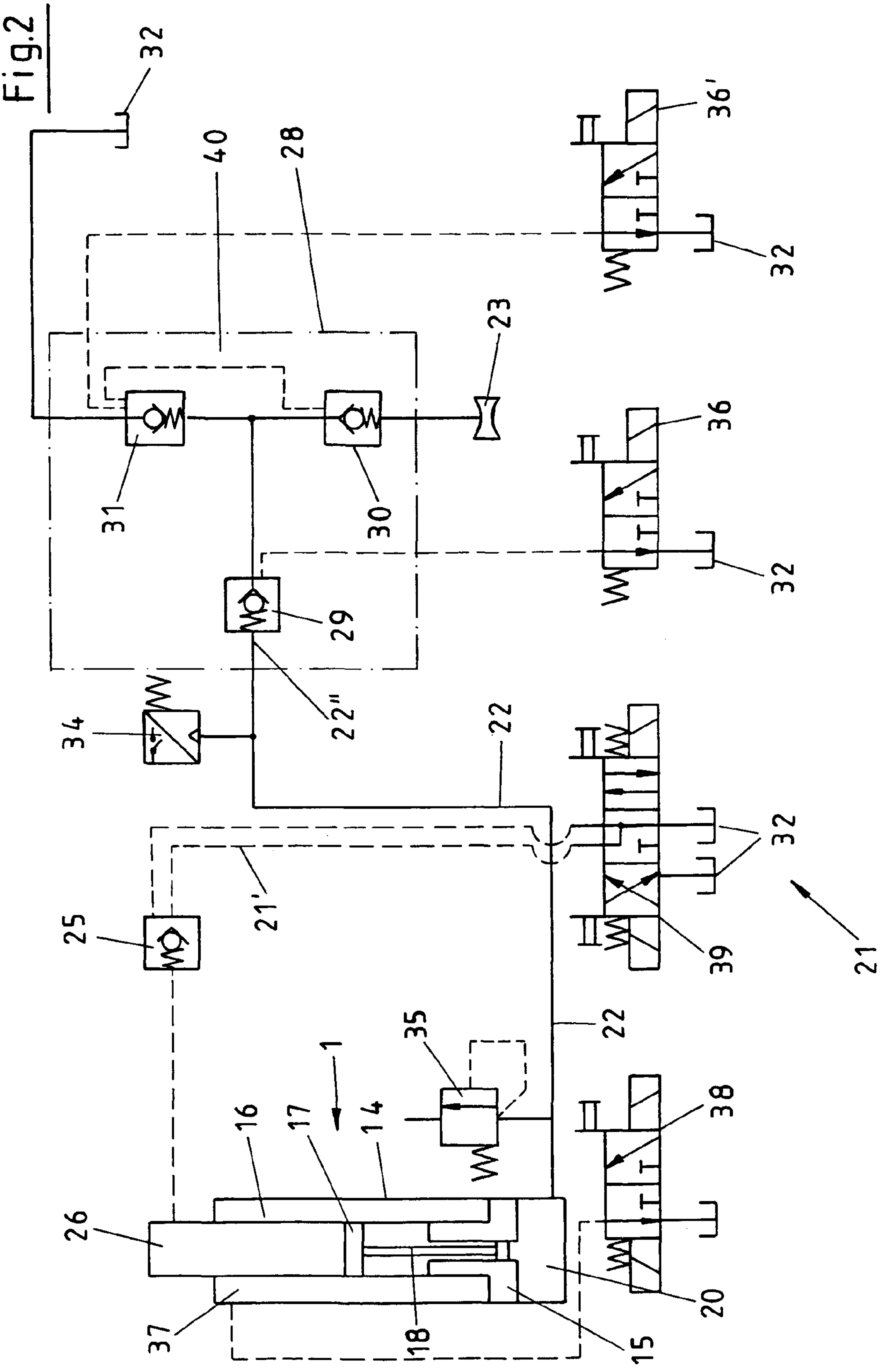
FIG. 2: the switching diagram for the control unit required for the adjustment process

FIG. 2 shows a simplified switching diagram for the control unit 21 in question. By means of this control unit 21, the cylinder 1 is actuated with hydraulic medium, so that the piston 15 with the piston rod 16 is pushed out of the cylinder housing 14 and braced against the hanging wall 11. A tensioning piston 17 with a tensioning piston rod 18 is disposed within the piston rod 16. In this way, the hydraulic medium in the piston rod cavity 26 can also be pressed into the cylinder space 20, after the cylinder space has previously been filled with a hydraulic medium, for example, at 175 bar. The means of doing this is described below.

For the filling and discharging of the cylinder space 20, and thereby of the entire cylinder 1, a valve block 28 with releasable check valves 29, 30 and a blockable check valve 31 is disposed between the high-pressure pump 23 and the cylinder space 20. This valve block 28 is connected to the connection line 22 and ensures that the hydraulic medium from the high-pressure pump 23 is conducted in a specific manner into the cylinder space 20, but also into the piston rod cavity 26. The latter takes place through the activation of the 3/4-directional valve 39, so that the high-pressure pump 23 is almost directly connected to the piston rod cavity 26. The hydraulic medium thereby automatically passes the releasable check valve 25. Following the conclusion of the pressure adjustment, which is only subsequently initiated, the releasable check valve 25 closes and ensures that the hydraulic medium remains safely in the piston rod cavity 26. The aforesaid releasable check valve 25 is accommodated in the connection line 22'.

Should the piston rod cavity 26 later have to be discharged, along with the cylinder space 20, the actuation of the 3/4-directional valve 39 ensures that hydraulic medium is fed from the high-pressure pump 23 to the releasable check valve 25, directly into the valve space, so that the valve is released and the incoming hydraulic medium can flow out of the piston rod cavity 26 in the direction of the tank 32.

Prior to the above-described actuation of the 3/4-directional valve 39 and the filling and subsequent emptying of the piston rod cavity 26, the piston rod 16 with the piston 15 must first be extended. To this end, the cylinder space 20 must be connected to the high-pressure pump 23. For this purpose, the aforementioned valve block 28 with the check valves 29, 30, 31 is switched on in the connection line 22".

In order to fill the cylinder space 20, hydraulic medium is initially fed via the 2/2-directional valve 36' to the blockable check valve 31 and simultaneously to the releasable check valve 30. As a result, the blockable check valve 31 is initially closed, and at the same time or shortly thereafter, the releasable check valve 30 is opened. This enables hydraulic medium to be fed from the high-pressure pump 23, or via the high-pressure pump 23 and the connection line 22', to the first releasable check valve 29, which then opens, pushing the hydraulic medium past the pressure switch 34 and into the cylinder space 20. The aforementioned pressure switch 34 is associated directly with the first releasable check valve 29, and can monitor the pressure of the hydraulic medium flowing by so that in case of doubt the supply process can be interrupted in order to prevent damage.

When the filling process of the cylinder space 20 has been completed and the adjustment process has also been completed by filling of the piston rod cavity 26, the pressure limit valve 35 assumes its monitoring function and ensures that no overload of the cylinder 1 takes place, by spraying hydraulic medium through the pressure limit valve 35 in the case of overpressure.

Should it be necessary to discharge the cylinder 1, the releasable check valve 25 is opened by means of the 3/4-directional valve 39, and simultaneously, the releasable check valve 29 is opened by means of the 2/2-directional valve 36. Because the releasable check valve 30 is closed and the blockable check valve 31 is again opened through the actuation of the 2/2-directional valve 36', the hydraulic medium can now escape from the cylinder space 20 into the tank 32. This process is also supported by the fact that the annular space 37 is filled with hydraulic medium via the 2/2-directional valve 38. The hydraulic medium presses on the piston ring surface and ensures that the retraction process of the piston 15 is supported. When the cylinder 1 is subsequently pressurized, the control and regulation process described above takes place.

The aforementioned check valves 29, 30 and 31 are accommodated in a valve block 28, which is accommodated in a stable valve housing 40 which will now be briefly explained with reference to FIGS. 3 and 4.

Figure 3:
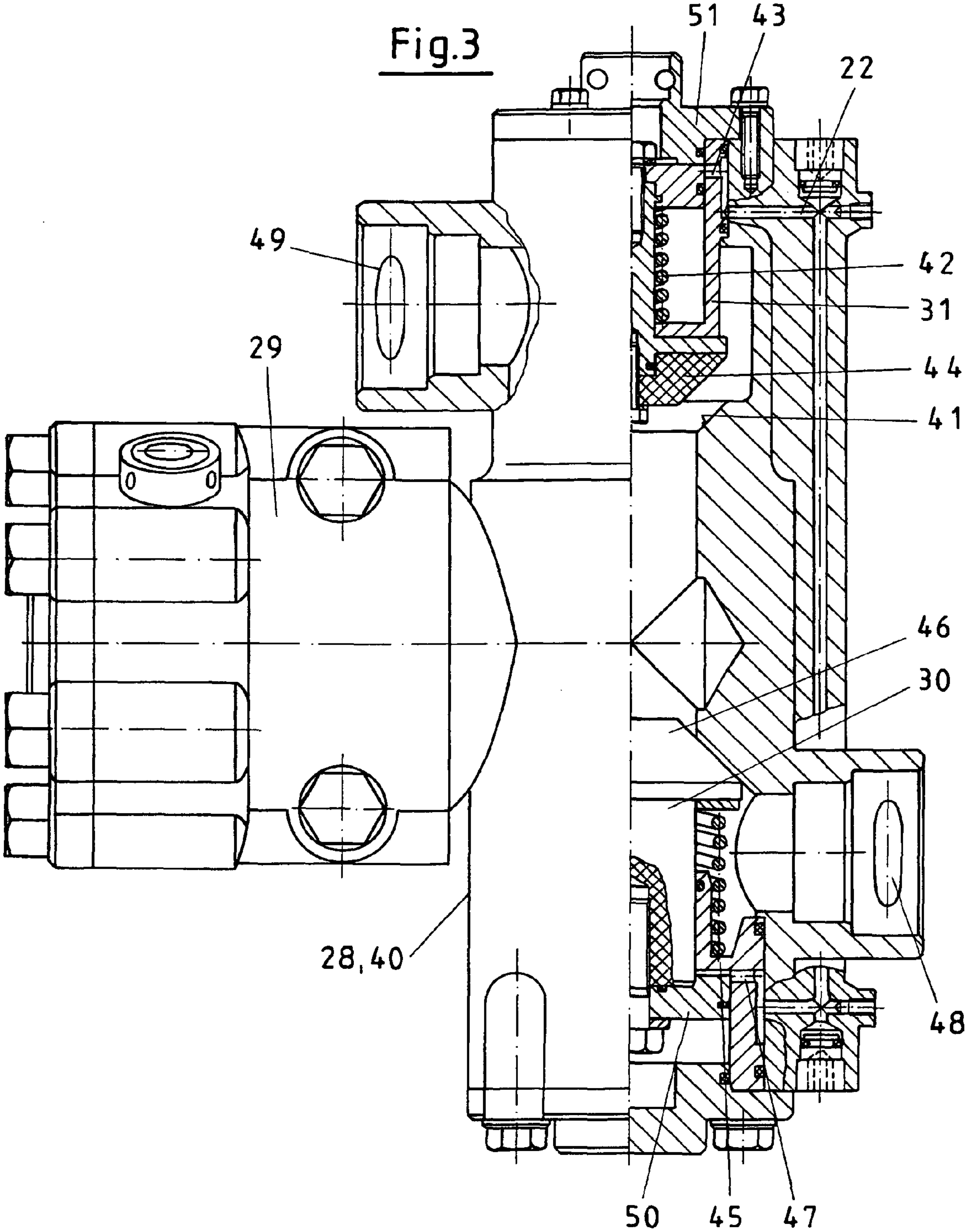
FIG. 3: a side view with a partial cross-section of two of the check valves associated with the valve block

The top part of FIG. 3 shows the blockable check valve 31, which, in the switching position shown, is prevented by the spring 42 from abutting against the sealing surface 41 with its sealing head 44. If hydraulic medium is now introduced via the inlet 43, the sealing head 44 will be pushed inward against the force of the spring 42 onto the sealing surface 41.

Simultaneously with the closing of the blockable check valve 31, hydraulic medium also flows through the inlet 47 into the releasable check valve 30, whereby the sealing head 46 is pushed outward against the force of the spring 45 out of the respective sealing surface. It is now possible for hydraulic medium to flow through the pump connection 48, in the direction of the first releasable check valve 29, and thus of the connection line 22. The piston of the releasable check valve 30 is designated by the number 50, and the piston of the blockable check valve 31 by the number 51.

Figure 4:
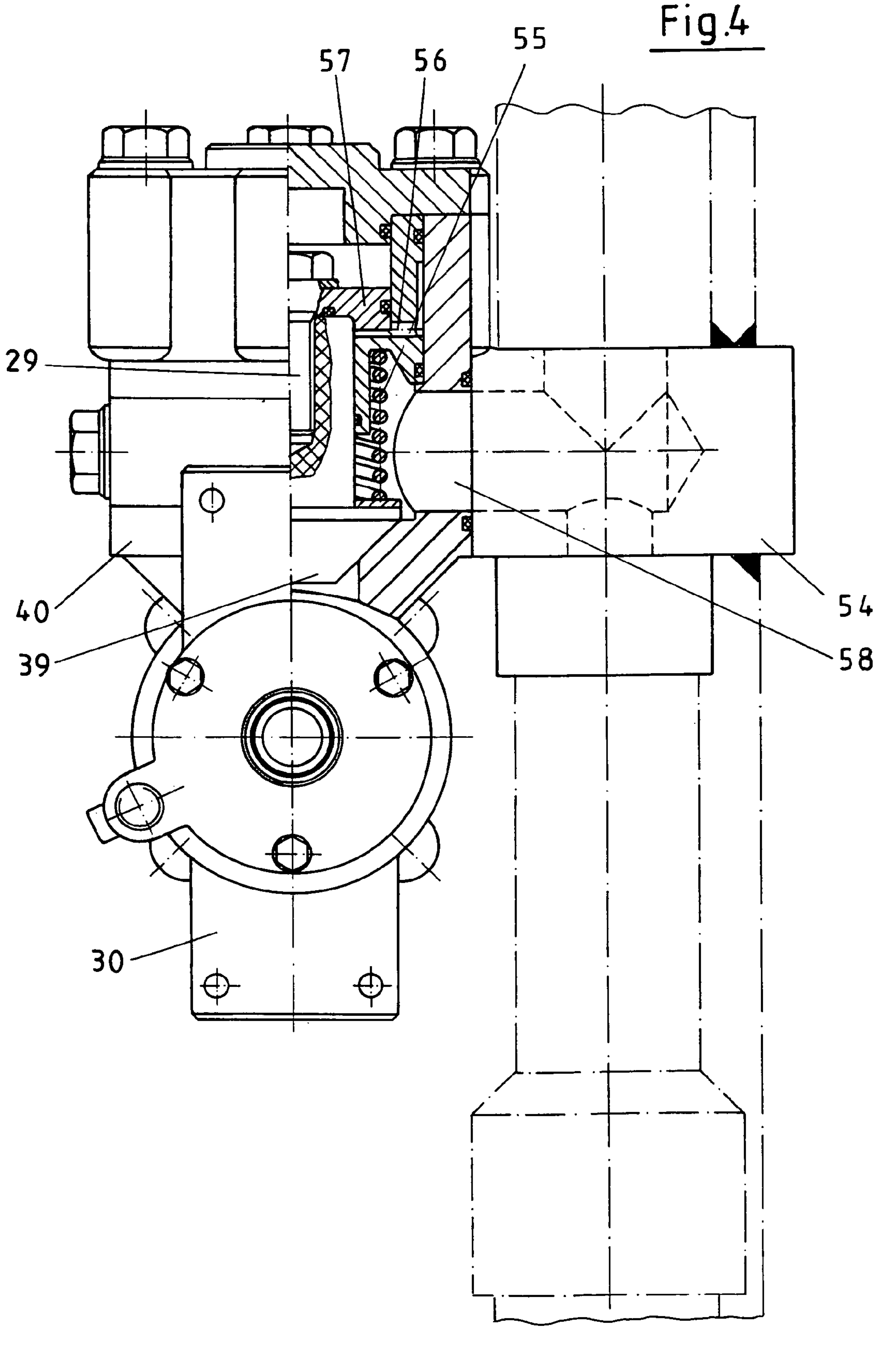
FIG. 4: a top view of the valve housing with the first releasable check valve, in partial cross-section

Finally, FIG. 4 shows a top view of the valve housing 40, whereby, by means of a cross-section, the first releasable check valve 39 may also be seen. This check valve too is a releasable check valve 29, whereby the spring 55 ensures that the releasable check valve 29 is normally closed. If hydraulic medium is now fed to the releasable-check valve 29 via the inlet 56 by means of the 2/2-directional valve 36, the piston will accordingly be loaded and will ensure that the sealing head 59 moves out of the sealing surface, against the force of the spring 55, whereby the piston is designated by the number 57. While the connection 58 leads and/or connects to the cylinder 1 and/or to the cylinder space 20, the connection 49, as shown in FIG. 3, is the one which connects to the tank 32.

The holder by means of which the valve housing 40 is secured to the cylinder 1 is designated by the number 54.

All of the features described above, including those which may only be derived from the drawings, are to be considered, individually and in combination, as fundamental to the invention.

The invention claimed is:

1. Device for increasing pressure in cylinders (1), especially those of the hydraulic construction (2) used in underground mining and tunnel construction, which, together with the cylinder housing (14), piston (15), piston rod (16) thereof and the tensioning piston (17) arranged therein, and the tensioning piston rod (18) which can be inserted into the cylinder space (20), can be actuated with a hydraulic medium by means of a high-pressure pump (23), via a connection line (22) with an integrated control unit (21), wherein the control unit (21) has a releasable check valve (25) in the connection line (22') between the high-pressure pump (23) and the piston rod cavity (26), and a valve block (28) with releasable and/or blockable additional check valves (29, 30, 31) in the connection line (22") between the high-pressure pump (23) and the cylinder space (20).

2. Device according to claim 1, wherein the valve block (28) features a check valve (30) which blocks against the high-pressure pump (23) and a releasable check valve (29) which blocks against the cylinder space (20), as well as a blockable check valve (31) which is associated with the tank (32).

3. Device according to claim 2, wherein the blockable check valve (31) is constructed in such a way as to be blockable by connection with the high-pressure pump (23), and otherwise to be permanently open.

4. Device according to claim 2, wherein the releasable check valve (30) which blocks against the high-pressure pump (23) can also be connected to the high-pressure pump (23) on the opening side at the same time as the blockable check valve (31).

5. Device according to claim 1, wherein the blockable check valve (31) and the check valve (29) which blocks against the cylinder space (20) are designed such that each of them can be controlled by a 2/2-directional valve (36, 36').

6. Device according to claim 1, wherein a pressure switch (34), which can be adjusted to the filling pressure of the cylinder space (20), is provided at the outlet side of the check valve (29) which blocks against the cylinder space (20).

7. Device according to claim 1, wherein a pressure limit valve (35), which is or can be adjusted to the pressure which is necessary or desired in the cylinder, space (20) at any time, is associated with the cylinder space (20).

8. Device according to claim 1, wherein a 2/2-directional control valve (38) is associated with the annular space (37) around the piston rod (16), for connection to the high-pressure pump (23).

9. Device according to claim 1, wherein the releasable check valve (25) associated with the piston rod cavity (26) is designed in such a way that it can be controlled by a 3/4-directional valve (39).

10. Device according to claim 1, wherein the 2/2-directional and 3/4-directional valves (36, 36', 38, 39) are constructed as electrically, hydraulically or electrically/hydraulically controllable control valves.

11. Device according to claim 1, wherein the 2/2-directional and 3/4-directional valves (36, 36', 38, 39) are controlled by means of a common circuit board.

12. Device according to claim 1, wherein the valve block (28) with the two releasable check valves and the blockable check valve (29, 30, 31) features a common valve housing (40), associated with the cylinder (1).

* * * * *